US012801475B2

(12) United States Patent
Shioyasu et al.

(10) Patent No.: US 12,801,475 B2
(45) Date of Patent: Nov. 17, 2026

(54) CONTROL APPARATUS, CONTROL METHOD, IMAGE PROCESSING APPARATUS, AND NON-TRANSITORY COMPUTER READABLE MEDIUM

(71) Applicant: FUJIFILM Business Innovation Corp., Tokyo (JP)

(72) Inventors: Asahito Shioyasu, Kanagawa (JP); Masahiko Otsu, Kanagawa (JP); Kenta Nomura, Kanagawa (JP); Tomoki Tanihata, Kanagawa (JP); Toma Taguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/178,639

(22) Filed: Mar. 6, 2023

(65) Prior Publication Data

US 2024/0103956 A1 Mar. 28, 2024

(30) Foreign Application Priority Data

Sep. 26, 2022 (JP) ................................. 2022-152517

(51) Int. Cl.
*G06F 11/00* (2006.01)
*G06F 11/07* (2006.01)

(52) U.S. Cl.
CPC ........ *G06F 11/079* (2013.01); *G06F 11/0724* (2013.01)

(58) Field of Classification Search
CPC . G06F 11/079; G06F 11/0724; G06F 11/3065
See application file for complete search history.

(56) References Cited

U.S. PATENT DOCUMENTS

2018/0107559 A1* 4/2018 Machida ............. G06F 11/3024

FOREIGN PATENT DOCUMENTS

| | | | |
|---|---|---|---|
| JP | 2008-305317 | A | 12/2008 |
| JP | 2011-159136 | A | 8/2011 |
| JP | 2012-073748 | A | 4/2012 |
| JP | 6049961 | B1 | 12/2016 |
| JP | 2021-096729 | A | 6/2021 |

OTHER PUBLICATIONS

May 19, 2026 Office Action issued in Japanese Patent Application No. 2022-152517.

* cited by examiner

*Primary Examiner* — Katherine Lin
(74) *Attorney, Agent, or Firm* — Oliff PLC

(57) ABSTRACT

A control apparatus includes multiple processor cores connected to: a monitor that monitors whether a first processor core, the first processor core being any processor core among the multiple processor cores, is operating normally; and a memory having multiple storage areas pre-associated with each of the multiple processor cores. Each of the multiple processor cores periodically writes and updates information to the corresponding storage area in the memory, the information indicating that each of the processor cores is operating normally, and the first processor core determines whether the information in each of the storage areas in the memory has been updated by each of the multiple processor cores, and controls the monitor on the basis of a result of the determination.

18 Claims, 13 Drawing Sheets

CONTROL APPARATUS, CONTROL METHOD, IMAGE PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-152517 filed Sep. 26, 2022.

BACKGROUND

(i) Technical Field

The present disclosure relates to a control apparatus, a control method, an image processing apparatus, and a non-transitory computer readable medium.

(ii) Related Art

For example, Japanese Unexamined Patent Application Publication No. 2012-73748 describes a control apparatus provided with a multi-core CPU including at least a first core and a second core that execute pre-allocated processes. In the control apparatus, the second core is provided with first core monitoring means for detecting an abnormality in the first core, and the first core is provided with second core monitoring means for detecting an abnormality in the second core. If an abnormality in the second core is detected through the second core monitoring means, the first core executes a first proxy process that executes by proxy a process to be executed on the second core, and if an abnormality in the first core is detected through the first core monitoring means, the second core executes a second proxy process that executes by proxy a process to be executed on the first core.

SUMMARY

A processor installed in a controller may be provided with multiple processor cores for improved performance. On the other hand, in an apparatus that operates at high temperatures and high voltages, for example, a watch dog timer (WDT) may be used from a safety standpoint to reset the system into a safe state in the event of a malfunction.

However, in the case where the WDT is shared among multiple processor cores and notifications are sent to the WDT to indicate that each of the multiple processor cores is continuing to operate normally, if the notifications overlap, an arbitration function that arbitrates the overlapping notifications is desirable to avoid contention among the multiple processor cores. If contention occurs, there is a possibility that the WDT will no longer receive notifications, incorrectly recognize that the processor cores are not operating normally, and initiate an unnecessary reset.

Aspects of non-limiting embodiments of the present disclosure relate to avoiding contention among notifications from multiple processor cores.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a control apparatus including multiple processor cores connected to: a monitor that monitors whether a first processor core, the first processor core being any processor core among the multiple processor cores, is operating normally; and a memory having multiple storage areas pre-associated with each of the multiple processor cores, wherein each of the multiple processor cores periodically writes and updates information to the corresponding storage area in the memory, the information indicating that each of the processor cores is operating normally, and the first processor core determines whether the information in each of the storage areas in the memory has been updated by each of the multiple processor cores, and controls the monitor on the basis of a result of the determination.

BRIEF DESCRIPTION OF THE DRAWINGS

Exemplary embodiments of the present disclosure will be described in detail based on the following figures, wherein.

DETAILED DESCRIPTION

Figure 1:
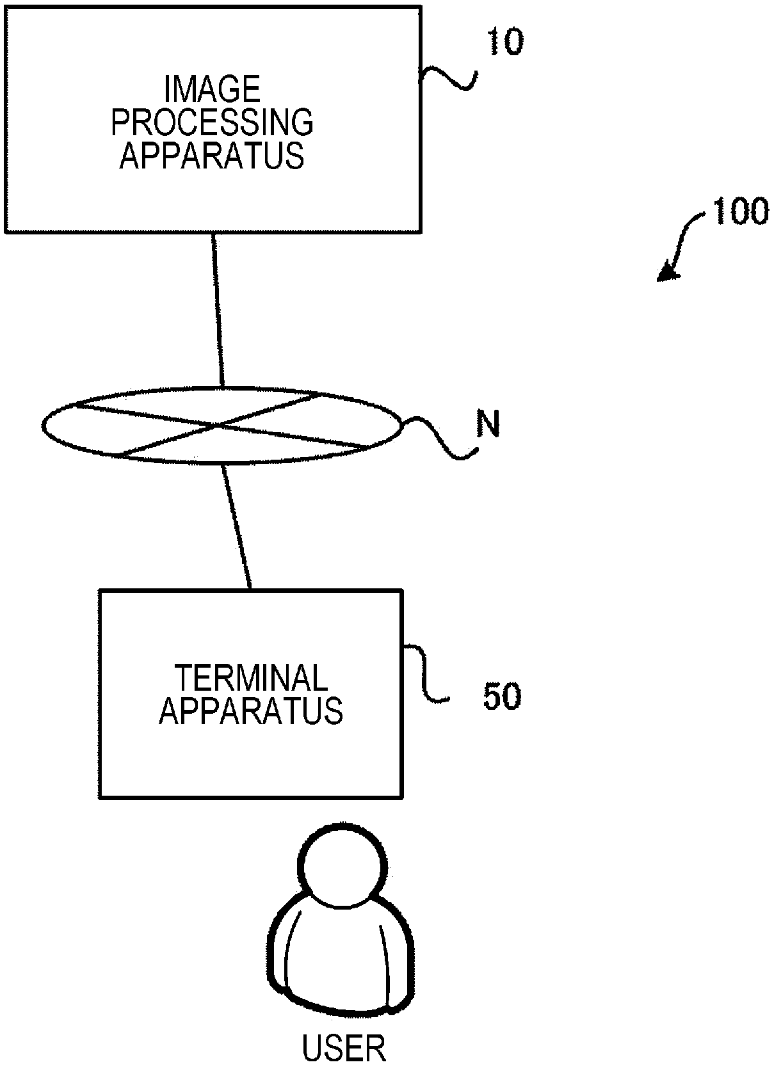
FIG. 1 is a diagram illustrating an example of a configuration of an image processing system according to a first exemplary embodiment.

Hereinafter, exemplary embodiments for carrying out the present disclosure will be described in detail and with reference to the drawings. Note that components and processes whose operation, action, or function achieves the same effect are denoted with the same signs throughout all drawings, and a duplicate description thereof may be reduced or omitted in some cases, as appropriate. The drawings are merely schematic illustrations intended as an aid for fully understanding the technology of the present disclosure. Thus, the technology of the present disclosure is not solely limited to the examples illustrated in the drawings. Moreover, in the exemplary embodiments, a description may be reduced or omitted in some cases for portions of the configuration which are well known or which do not relate directly to the technology of the present disclosure.

First Exemplary Embodiment

FIG. 1 is a diagram illustrating an example of a configuration of an image processing system 100 according to a first exemplary embodiment.

As illustrated in FIG. 1, the image processing system 100 according to the present exemplary embodiment is provided with an image processing apparatus 10 and a terminal apparatus 50. The example in FIG. 1 illustrates a single terminal apparatus, but there may be any number of terminal apparatuses.

The image processing apparatus 10 executes image-related functions according to instructions from a user. The image processing apparatus 10 is connected through a network N to the terminal apparatus 50 used by the user. Note that for the network N, a network such as the Internet, a local area network (LAN), or a wide area network (WAN) is applied. There are no restrictions on the topology of the network N, which may be wired, wireless, or a mix of wired and wireless topologies.

In one example, the image processing apparatus 10 has a scan function that reads, as image data, an image recorded onto a recording medium such as paper, a print function that forms an image expressed by image data onto a recording medium, and a copy function in which an image that is the same as an image formed on a recording medium is formed onto another recording medium. The copy function, print function, and scan function are examples of image processing in the image processing apparatus 10.

Any of various types of devices may be applied as the terminal apparatus 50, such as a personal computer (PC), a smartphone, or a tablet used by the user, for example.

The user transmits image data generated in the terminal apparatus 50 to the image processing apparatus 10 through the network N, thereby causing the image processing apparatus 10 to execute desired image processing. Alternatively, the user may store image data in a portable storage medium such as Universal Serial Bus (USB) memory or a memory card, move to the image processing apparatus 10, and connect the portable storage medium to the image processing apparatus 10, thereby causing the image processing apparatus 10 to execute desired image processing. Furthermore, the user may also bring a document to the image processing apparatus 10, the document having at least one of text or an image recorded thereon, and cause the image processing apparatus 10 to read the document, thereby causing the image processing apparatus 10 to execute desired image processing.

Figure 2:
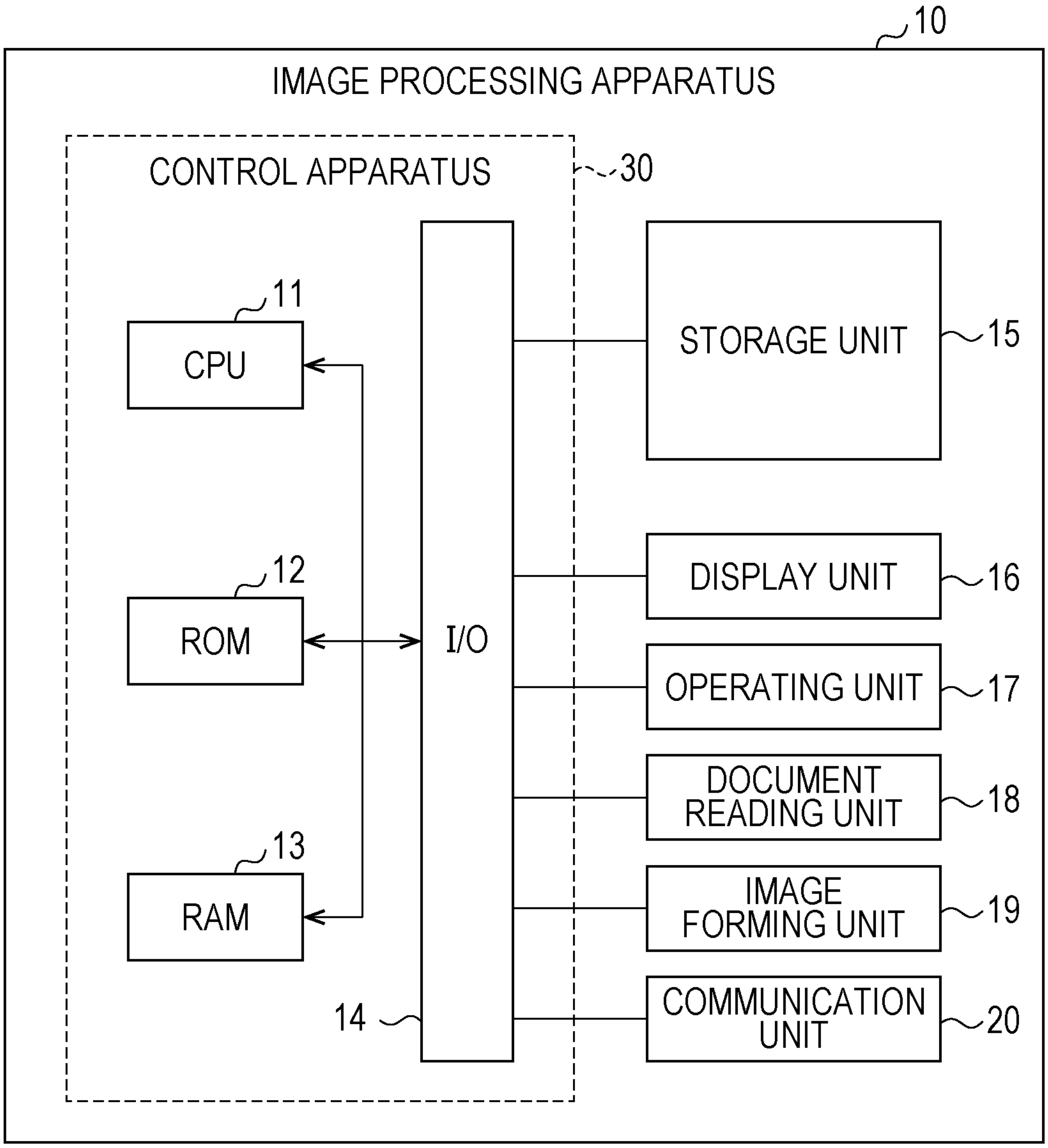
FIG. 2 is a block diagram illustrating an example of an electrical configuration of an image processing apparatus according to the first exemplary embodiment.

FIG. 2 is a block diagram illustrating an example of an electrical configuration of the image processing apparatus 10 according to the first exemplary embodiment.

As illustrated in FIG. 2, the image processing apparatus 10 according to the present exemplary embodiment is provided with a central processing unit (CPU) 11, read-only memory (ROM) 12, random access memory (RAM) 13, an input-output interface (I/O) 14, a storage unit 15, a display unit 16, an operating unit 17, a document reading unit 18, an image forming unit 19, and a communication unit 20. The CPU 11 is an example of a processor.

The CPU 11, ROM 12, RAM 13, and I/O 14 are interconnected through a bus. Each functional unit, including the storage unit 15, the display unit 16, the operating unit 17, the document reading unit 18, the image forming unit 19, and the communication unit 20, is connected to the I/O 14. Each of these functional units is capable of bidirectional communication with the CPU 11 through the I/O 14.

The CPU 11, ROM 12, RAM 13, and I/O 14 form a control apparatus that functions as a controller. The control apparatus 30 may be configured as a sub-controller that controls a subset of operations by the image processing apparatus 10, or may be configured as a main controller that controls all operations by the image processing apparatus 10. An integrated circuit such as a large-scale integration (LSI) chip or an integrated circuit (IC) chipset is used for some or all of the blocks of the control apparatus 30, for example. A discrete circuit may be used for each of the above blocks, or a circuit integrating some or all of the above blocks may be used. The above blocks may be provided together as a single body, or some blocks may be provided separately. Also, a part of each of the above blocks may be provided separately. The integration of the control apparatus 30 is not limited to LSI, and a dedicated circuit or a general-purpose processor may also be used. Note that the control apparatus 30 may also be configured as the CPU 11 alone.

A control program that controls operations by the CPU 11 is stored in the ROM 12. The control program may be pre-installed in the control apparatus 30, for example. The control program may also be achieved by being stored on a non-volatile storage medium or distributed over the network N, and appropriately installed in the control apparatus 30. Note that anticipated examples of the non-volatile storage medium include a Compact Disc Read-Only Memory (CD-ROM), a magneto-optical disc, an HDD, a Digital Versatile Disc Read-Only Memory (DVD-ROM), flash memory, a memory card, and the like.

For the storage unit 15, a hard disk drive (HDD), a solid-state drive (SSD), flash memory, or the like is used, for example.

For the display unit 16, a liquid crystal display (LCD), an organic light-emitting diode (OLED) display, or the like is used, for example. The display unit 16 may include an integrated touch panel. On the operating unit 17, various operating keys such as a keypad and a Start key are provided, for example. The display unit 16 and the operating unit 17 may serve as an operating panel that receives, from the user of the image processing apparatus 10, various instructions related to image processing functions and settings. The various instructions include, for example, an instruction to start reading a document, an instruction to start copying a document, and a print instruction for printing print data held in the image processing apparatus 10. The display 16 displays various information such as the results of processes executed in accordance with instructions received from the user, notifications about processes, and the like.

The document reading unit 18 takes in one page at a time of a document placed in a paper feed tray of an automatic document feeder (not illustrated) provided on the top of the image processing apparatus 10, and optically reads the taken-in document to obtain image data. Alternatively, the document reading unit 18 optically reads a document placed on a document bed such as a platen glass to obtain image data.

The image forming unit 19 forms, on paper as one example of a recording medium, an image based on image data obtained by the reading by the document reading unit 18 or image data obtained from a print instruction given by the terminal apparatus 50. The image forming unit 19 is one example of an image processor. Note that an electrophotographic system is described hereinafter as an example of the system of forming images, but another system, such as an inkjet system, may also be adopted.

In the case in which the system of forming images is an electrophotographic system, the image forming unit 19 includes a photoreceptor drum, a charger, an exposure device, a developer, a transfer device, and a fuser. The charger applies a voltage to the photoreceptor drum to charge the surface of the photoreceptor drum. The exposure device forms an electrostatic latent image on the photoreceptor drum by exposing the photoreceptor drum charged by the charger with light corresponding to the image data. The developer forms a toner image on the photoreceptor drum by developing with toner the electrostatic latent image formed on the photoreceptor drum. The transfer device transfers the toner image formed on the photoreceptor drum onto paper. The fuser fuses the transferred toner image to the paper with heat and pressure.

The communication unit 20 is a communication interface for connecting to the network N such as the Internet, a LAN, or a WAN, and is capable of communicating with the terminal apparatus 50 over the network N.

Figure 3:
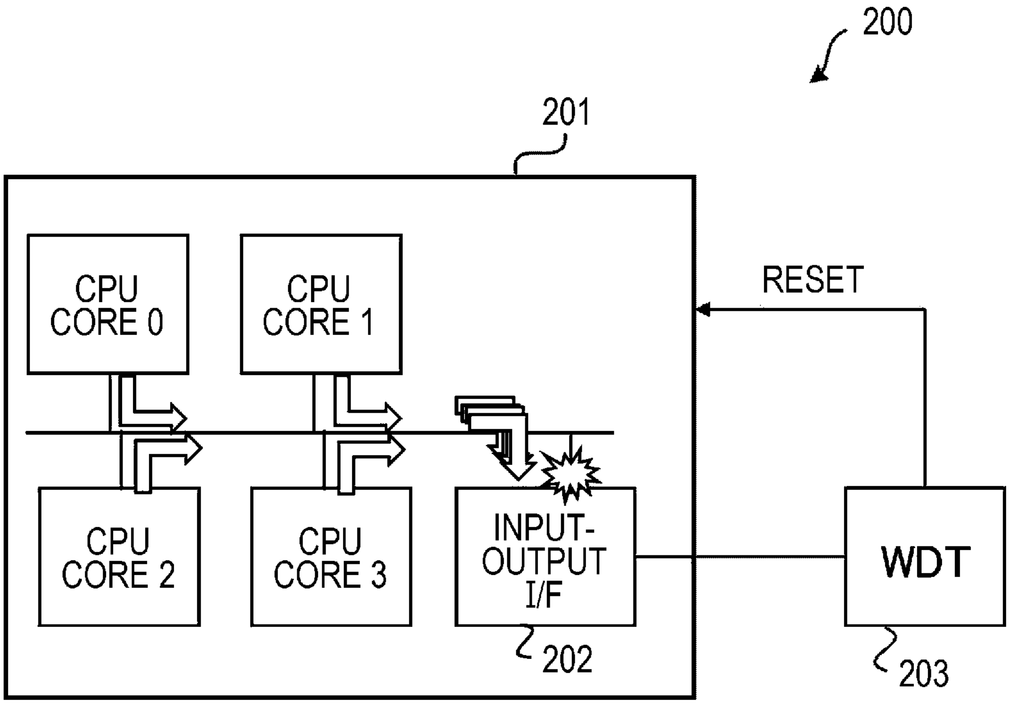
FIG. 3 is a block diagram illustrating a configuration of a control apparatus according to a comparative example.

FIG. 3 is a block diagram illustrating a configuration of a control apparatus 200 according to a comparative example;

As illustrated in FIG. 3, the control apparatus 200 is provided with a CPU 201. The CPU 201 is provided with multiple CPU cores 0 to 3 and an input-output interface (I/F) 202. For the input-output OF 202, general-purpose input/output (GPIO) or inter-integrated circuit (I2C) is applied, for example. The multiple CPU cores 0 to 3 are connected to a WDT 203 through the input-output OF 202.

The CPU 201 is provided with the multiple CPU cores 0 to 3 for improved performance. On the other hand, the WDT 203 is used to reset the system into a safe state in the event of a malfunction. The WDT 203 enters a monitoring state when the multiple CPU cores 0 to 3 start up, and programs running on the multiple CPU cores 0 to 3 execute a specific operation on a fixed time interval to notify the WDT 203 of information indicating that the CPU cores 0 to 3 are operating normally. If the WDT 203 does not receive a notification after the fixed time elapses, some kind of trouble is deemed to have occurred, and a predetermined process (such as a reset) for an abnormal event is executed by the WDT 203.

In the case where the WDT 203 is shared among the multiple CPU cores 0 to 3 and notifications are sent to the WDT 203 to indicate that each of the multiple CPU cores 0 to 3 is operating normally, if the notifications overlap, an arbitration function that arbitrates the overlapping notifications is desirable to avoid contention among the multiple CPU cores 0 to 3. If contention occurs, there is a possibility that the WDT 203 will no longer receive notifications, incorrectly recognize that the CPU cores 0 to 3 are not operating normally, and initiate an unnecessary reset.

Accordingly, the control apparatus 30 according to the present exemplary embodiment is provided with multiple processor cores, each of the multiple processor cores writes and updates information to a corresponding storage area of a memory, the information indicating that each of the processor cores is operating normally, and a first processor core, being any processor core among the multiple processor cores, determines whether the information in each storage area of the memory has been updated by each of the multiple processor cores, and controls a monitor on the basis of a result of the determination.

Figure 4:
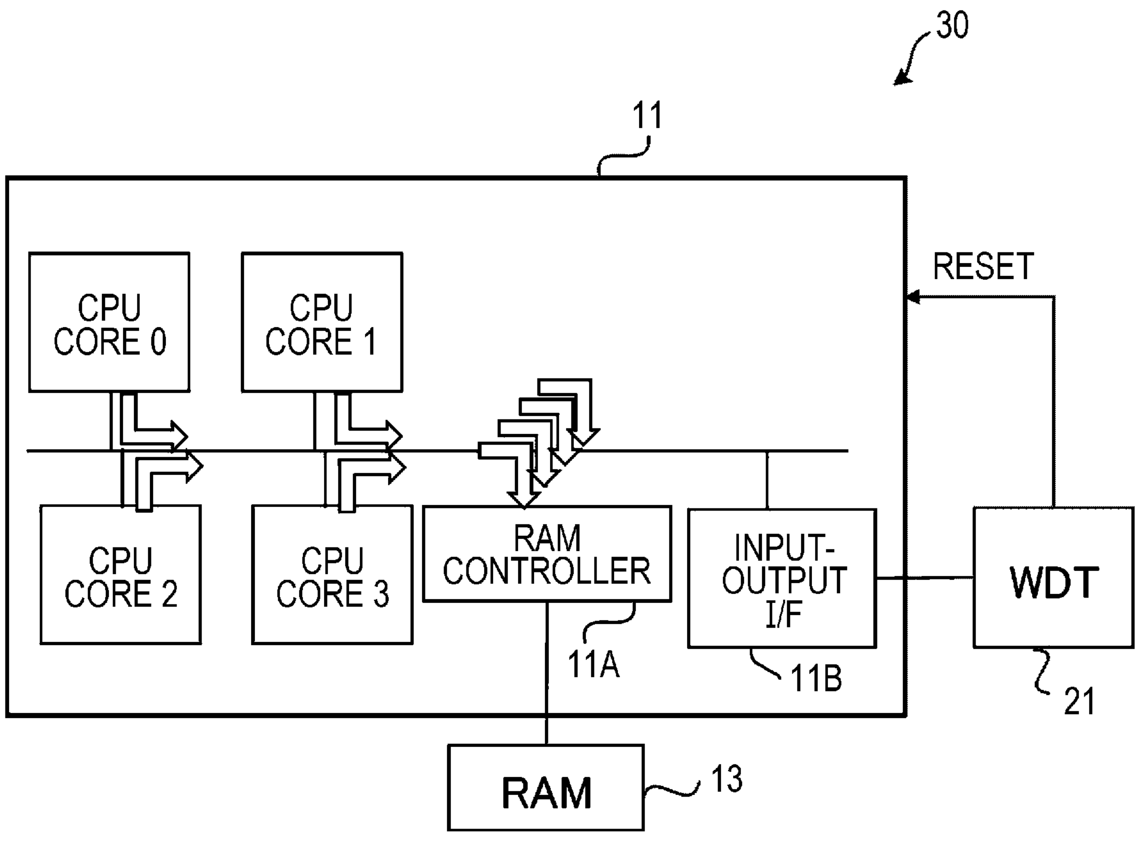
FIG. 4 is a block diagram illustrating an example of a configuration of a control apparatus according to the first exemplary embodiment.

FIG. 4 is a block diagram illustrating an example of a configuration of the control apparatus 30 according to the first exemplary embodiment. Note that the present exemplary embodiment describes a case in which the CPU 11 is applied as an example of a processor, the CPU cores 0 to 3 are applied as an example of processor cores, the RAM 13 is applied as an example of a memory, and the WDT 21 is applied as an example of a monitor.

As illustrated in FIG. 4, the control apparatus 30 is provided with the CPU 11. The CPU 11 is provided with multiple CPU cores 0 to 3, a RAM controller 11A, and an input-output I/F 11B. For the input-output I/F 11B, GPIO or I2C is applied, for example. The multiple CPU cores 0 to 3 are connected to the RAM 13 through the RAM controller 11A, and are connected to the WDT 21 through the input-output I/F 11B. Note that there are four CPU cores in the example in FIG. 4, but there simply may be two or more CPU cores. Moreover, the control apparatus 30 may be configured to include the CPU 11 only, or configured to include the CPU 11, the RAM 13, and the WDT 21.

The WDT 21 is a timer similar to the WDT 203 described above, but in the present exemplary embodiment, the WDT 21 monitors whether a first CPU core, which is any CPU core among the multiple CPU cores 0 to 3, is operating normally. Here, the first CPU core is assumed to be, for example, the CPU core 0 among the multiple CPU cores 0 to 3.

The RAM controller 11A is provided with an arbitration function that, when the multiple CPU cores 0 to 3 access the RAM 13, arbitrates the access timings to avoid contention among the accesses from the multiple CPU cores 0 to 3.

Figure 5:
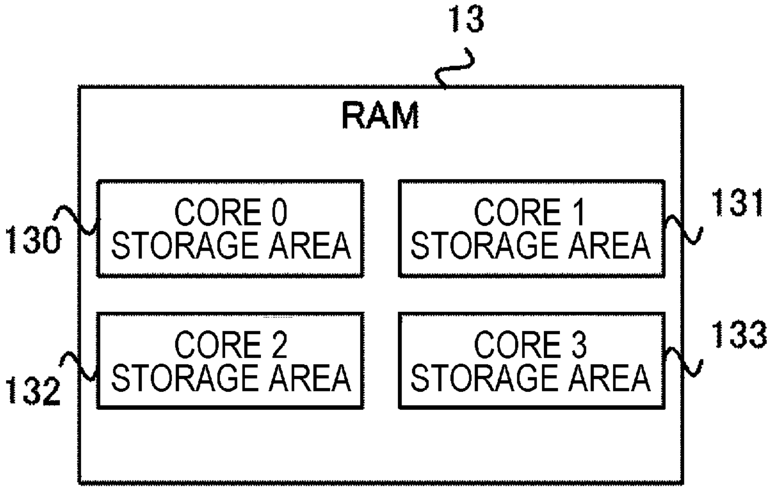
FIG. 5 is a diagram illustrating an example of a configuration of RAM according to the first exemplary embodiment.

FIG. 5 is a diagram illustrating an example of a configuration of the RAM 13 according to the first exemplary embodiment.

As illustrated in FIG. 5, the RAM 13 has multiple storage areas 130 to 133 pre-associated with each of the multiple CPU cores 0 to 3. In the example in FIG. 5, the core 0 storage area 130 is a storage area corresponding to the CPU core 0, and the core 1 storage area 131 is a storage area corresponding to the CPU core 1. The core 2 storage area 132 is a storage area corresponding to the CPU core 2, and the core 3 storage area 133 is a storage area corresponding to the CPU core 3. Note that the core 0 storage area 130, core 1 storage area 131, core 2 storage area 132, and core 3 storage area 133 are also collectively referred to as the storage areas 130 to 133.

As illustrated in FIGS. 4 and 5, each of the multiple CPU cores 0 to 3 executes a control program stored in the ROM 12 (FIG. 2) to thereby periodically write and update information (hereinafter referred to as "normal operation information") indicating that each CPU core is operating normally to the corresponding storage areas 130 to 133 in the RAM 13. That is, the CPU core 0 periodically writes normal operation information to the core 0 storage area 130, and the CPU core 1 periodically writes normal operation information to the core 1 storage area 131. The CPU core 2 periodically writes normal operation information to the core 2 storage area 132, and the CPU core 3 periodically writes normal operation information to the core 3 storage area 133. Note that the write timing of each of the CPU cores 0 to 3 is allowed to vary according to the processing content of each CPU core.

The CPU 0 that acts as the first CPU core executes a control program stored in the ROM 12 (FIG. 2) to thereby determine whether normal operation information in each of the storage areas 130 to 133 in the RAM 13 has been updated by each of the multiple CPU cores 0 to 3, and controls the WDT 21 on the basis of a result of the determination.

Specifically, the timing at which the CPU core 0 determines the presence or absence of an update of the normal operation information is different from the timing at which each of the multiple CPU cores 0 to 3 updates the normal operation information. The CPU core 0 determines the presence or absence of an update of the normal operation information between one update and the next update of the normal operation information.

If the normal operation information has been updated for each of the multiple CPU cores 0 to 3, the CPU core 0 instructs the WDT 21 to clear (cancel) a count. On the other hand, if the normal operation information has not been updated for one or more of the multiple CPU cores 0 to 3, the CPU core 0 determines that an abnormality has occurred and instructs the WDT 21 to reset all of the multiple CPU cores 0 to 3. Also, if the normal operation information has not been updated for one or more of the multiple CPU cores 0 to 3, the CPU core 0 may determine that an abnormality has occurred and instruct the WDT 21 to reset only the CPU core in which the abnormality has occurred from among the multiple CPU cores 0 to 3.

Figure 6:
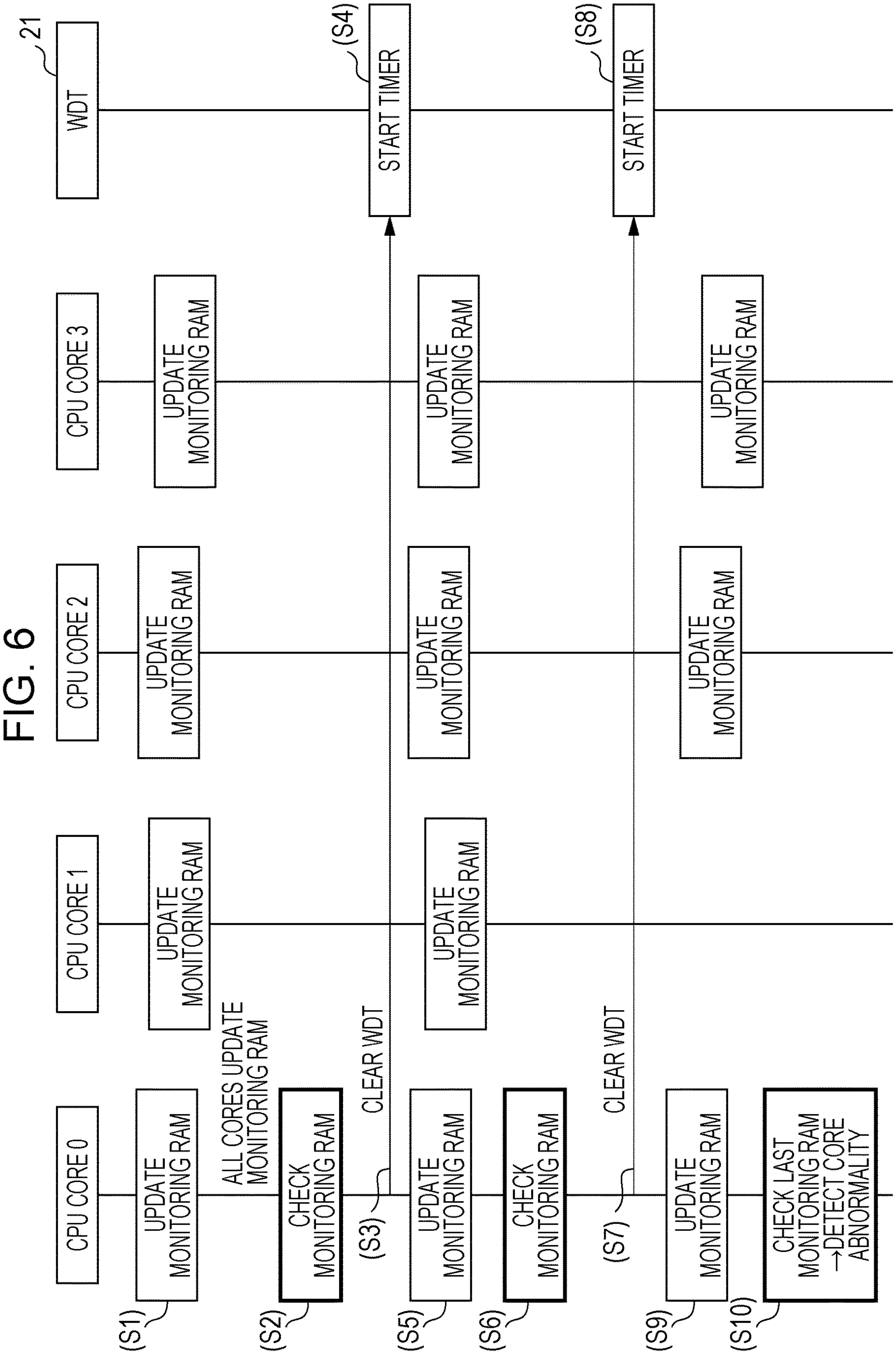
FIG. 6 is a sequence diagram illustrating an example of operations by the control apparatus according to the first exemplary embodiment.

FIG. 6 is a sequence diagram illustrating an example of operations by the control apparatus 30 according to the first exemplary embodiment.

In one example, in step S1 of FIG. 6, each of the CPU cores 0 to 3 writes and updates normal operation information to the corresponding storage areas 130 to 133 in the RAM 13 illustrated in FIG. 5 described above.

In step S2, the CPU core 0 checks whether normal operation information in each of the storage areas 130 to 133 in the RAM 13 has been updated by each of the multiple CPU cores 0 to 3.

In step S3, if the CPU core 0 confirms that normal operation information has been updated by each of the multiple CPU cores 0 to 3, the CPU core 0 instructs the WDT 21 to clear the timer count through the input-output I/F 11B.

In step S4, the WDT 21 clears the timer count according to the clear instruction from the CPU core 0, and starts a new timer count.

In step S5, each of the CPU cores 0 to 3 writes and updates normal operation information to the corresponding storage areas 130 to 133 in the RAM 13, similarly to (S1.

In step S6, the CPU core 0 checks whether normal operation information in each of the storage areas 130 to 133 in the RAM 13 has been updated by each of the multiple CPU cores 0 to 3.

In step S7, if the CPU core 0 confirms that normal operation information has been updated by each of the multiple CPU cores 0 to 3, the CPU core 0 instructs the WDT 21 to clear the timer count through the input-output I/F 11B.

In step S8, the WDT 21 clears the timer count according to the clear instruction from the CPU core 0, and starts a new timer count.

In step S9, each of the CPU cores 0, 2, 3 writes and updates normal operation information to the corresponding storage areas 130, 132, 133 in the RAM 13. On the other hand, the CPU core 1 does not write normal operation information to the corresponding core 1 storage area 131 in the RAM 13, and therefore the information is not updated.

In step S10, the CPU core 0 checks whether normal operation information in each of the storage areas 130 to 133 in the RAM 13 has been updated by each of the multiple CPU cores 0 to 3. At this point, since the normal operation information in the core 1 storage area 131 corresponding to the CPU core 1 has not been updated, an abnormality of some kind in the CPU core 1 is detected. If a core abnormality is detected, restoration is performed through a process of resetting only the abnormal core to put the system into a safe state, for example. Alternatively, restoration may be performed through a reboot by resetting all CPU cores from the WDT 21, without clearing the WDT 21.

Figure 7:
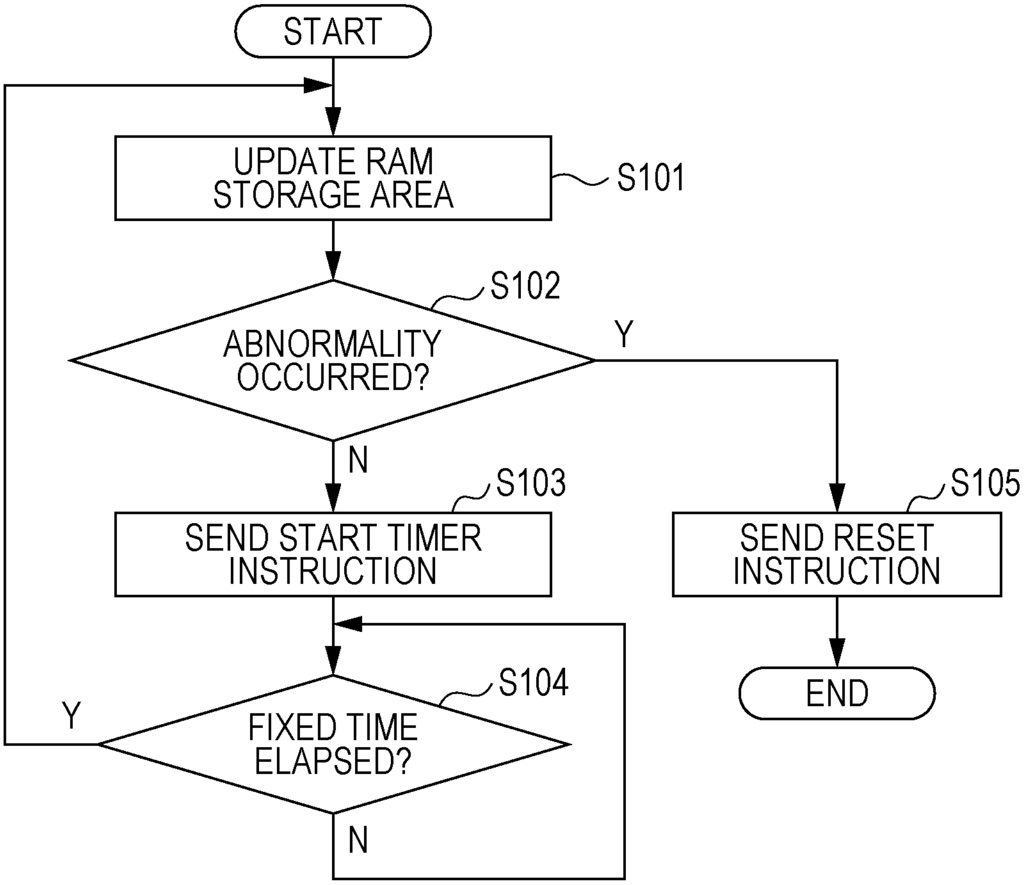
FIG. 7 is a flowchart illustrating an example of the flow of processing by a control program in a first CPU core according to the first exemplary embodiment.

Next, FIG. 7 will be referenced to describe the action of the control apparatus 30 according to the first exemplary embodiment.

FIG. 7 is a flowchart illustrating an example of the flow of processing by the control program in the first CPU core according to the first exemplary embodiment.

First, the control program is launched by the CPU core 0 serving as one example of the first CPU core, and the following steps are executed.

In step S101 of FIG. 7, the CPU core 0 writes and updates normal operation information to the core 0 storage area 130 in the RAM 13. At this time, if the other CPU cores 1 to 3 are also operating normally, normal operation information is written and updated to the storage areas 131 to 133 in the RAM 13, similarly to the CPU core 0.

In step S102, the CPU core 0 checks whether normal operation information in each of the storage areas 130 to 133 in the RAM 13 has been updated by each of the multiple CPU cores 0 to 3, or in other words, determines whether an abnormality is occurring. If an abnormality is not occurring, that is, if normality is determined (the case of a negative determination), the flow proceeds to step S103, whereas if it is determined that an abnormality is occurring (the case of a positive determination), the flow proceeds to step S105.

In step S103, the CPU core 0 instructs the WDT 21 to clear the count. The WDT 21 clears the timer count according to the clear instruction from the CPU core 0, and starts a new timer count.

In step S104, the CPU core 0 determines whether a fixed time has elapsed since the last update. In the case of determining that the fixed time has elapsed (the case of a positive determination), the flow returns to step S101 and the process is repeated, whereas in the case of determining that the fixed time has not elapsed (the case of a negative determination), the flow stands by in step S104.

On the other hand, in step S105, the CPU core 0 instructs the WDT 21 to reset all of the multiple CPU cores 0 to 3 or the CPU core(s) in which an abnormality has occurred among the multiple CPU cores 0 to 3, and ends the series of process according to the present control program.

In this way, according to the present exemplary embodiment, each of multiple processor cores writes and updates normal operation information to a corresponding storage area in a memory, while a first processor determines whether the normal operation information in each storage area in the memory has been updated by each of the multiple processor cores, and controls a monitor on the basis of a result of the determination. With this arrangement, contention among notifications from the multiple processor cores is avoided. Accordingly, it is possible to keep the monitor from incorrectly recognizing that the processor cores are not operating normally, and initiating an unnecessary reset.

Second Exemplary Embodiment

In the first exemplary embodiment above, each processor core is separately performing high-priority processing, and the memory update timings may not coincide in some cases. Accordingly, the second exemplary embodiment describes a configuration in which memory updates are possible even if the memory update timings do not coincide among multiple processor cores.

Figure 8:
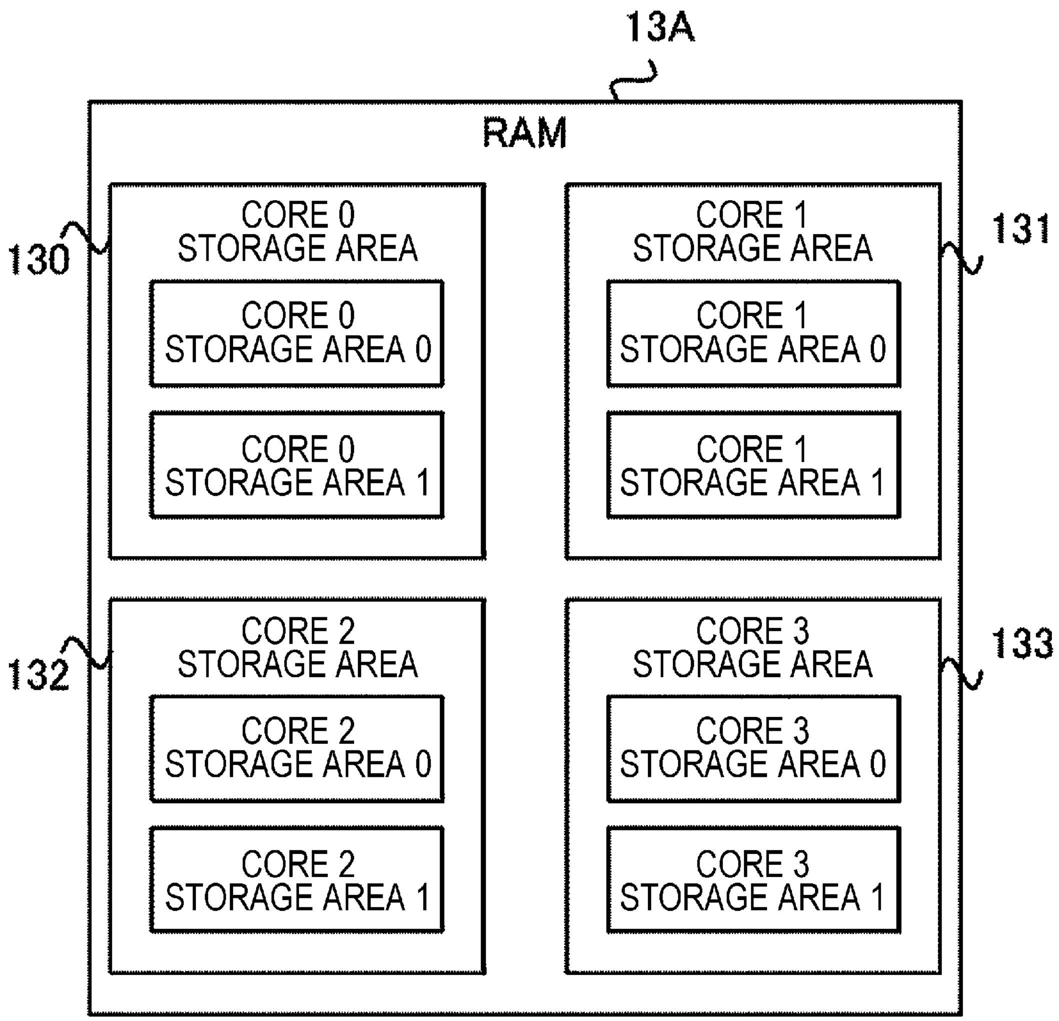
FIG. 8 is a diagram illustrating an example of a configuration of RAM according to a second exemplary embodiment.

FIG. 8 is a diagram illustrating an example of a configuration of RAM 13A according to the second exemplary embodiment. Note that the control apparatus (hereinafter referred to as the "control apparatus 30A") according to the present exemplary embodiment differs from the control apparatus 30 illustrated in FIG. 4 described above by including RAM 13A in place of the RAM 13, but is assumed to be similar otherwise.

As illustrated in FIG. 8, the RAM 13A has multiple storage areas for each of the multiple CPU cores 0 to 3. Namely, the core 0 storage area 130 includes a core 0 storage area 0 and a core 0 storage area 1. The core 1 storage area 131 includes a core 1 storage area 0 and a core 1 storage area 1. The core 2 storage area 132 includes a core 2 storage area 0 and a core 2 storage area 1. The core 3 storage area 133 includes a core 3 storage area 0 and a core 3 storage area 1. Note that the example in FIG. 8 illustrates two storage areas corresponding to each CPU core, but three or more storage areas may be provided. The core 0 storage areas 0 and 1, the core 1 storage areas 0 and 1, the core 2 storage areas 0 and 1, and the core 3 storage areas 0 and 1 are also collectively referred to as the storage areas 0 and 1.

Each of the multiple CPU cores 0 to 3 periodically writes and updates normal operation information sequentially to the corresponding multiple storage areas 0 and 1 in the RAM 13A. That is, the CPU core 0 sequentially writes normal operation information to the core 0 storage area 0 and the core 0 storage area 1, and the CPU core 1 sequentially writes normal operation information to the core 1 storage area 0 and the core 1 storage area 1. The CPU core 2 sequentially writes normal operation information to the core 2 storage area 0 and the core 2 storage area 1, and the CPU core 3 sequentially writes normal operation information to the core 3 storage area 0 and the core 3 storage area 1.

The CPU core 0 serving as the first CPU core determines that normal operation information has been updated if normal operation information has been updated in either or both of the multiple storage areas 0 and 1 for each of the multiple CPU cores 0 to 3. On the other hand, the CPU core 0 determines that normal operation information has not been updated if normal operation information has been updated in none of the multiple storage areas 0 and 1.

Figure 9:
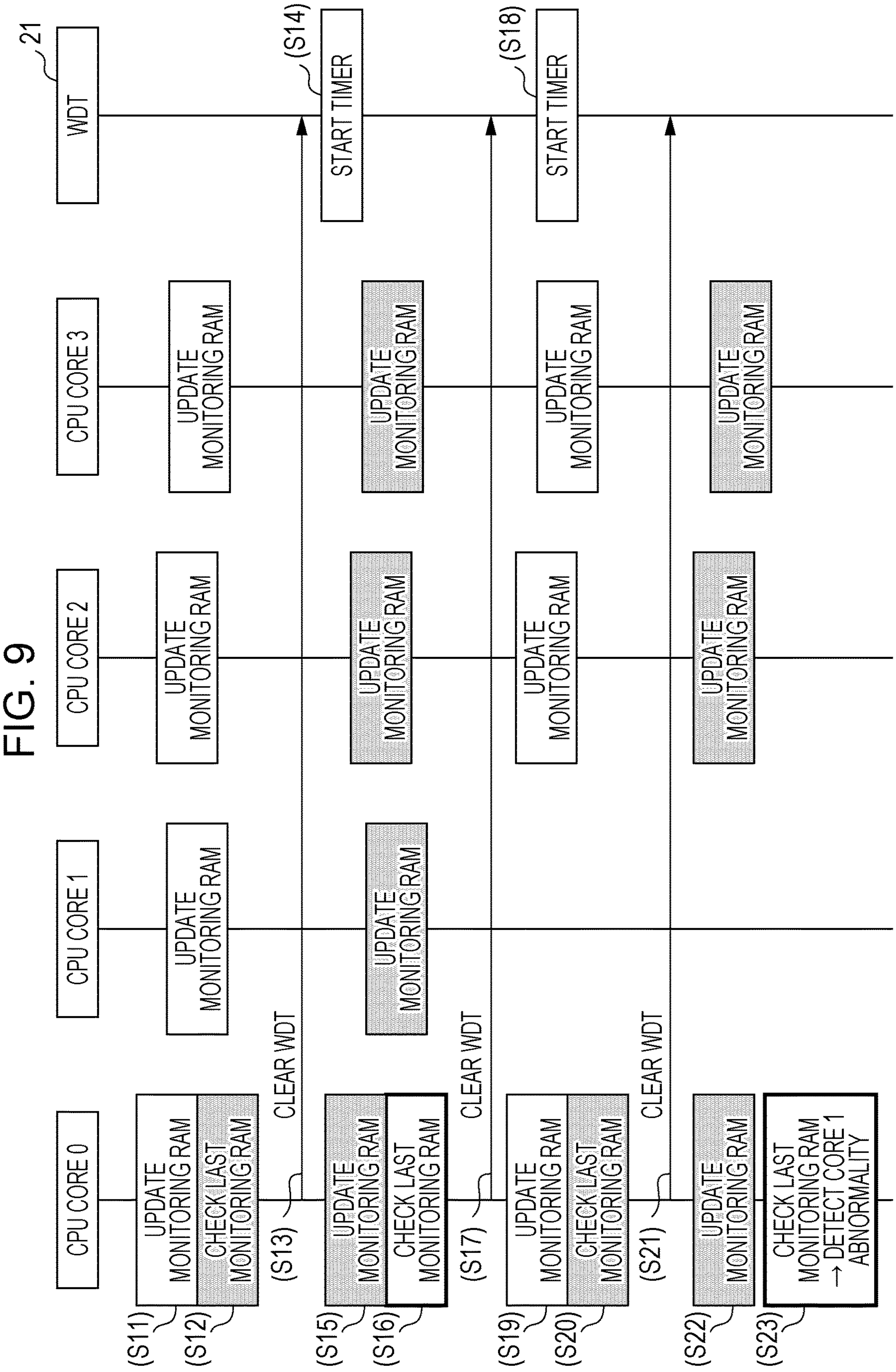
FIG. 9 is a sequence diagram illustrating an example of operations by the control apparatus according to the second exemplary embodiment.
Figure 10:
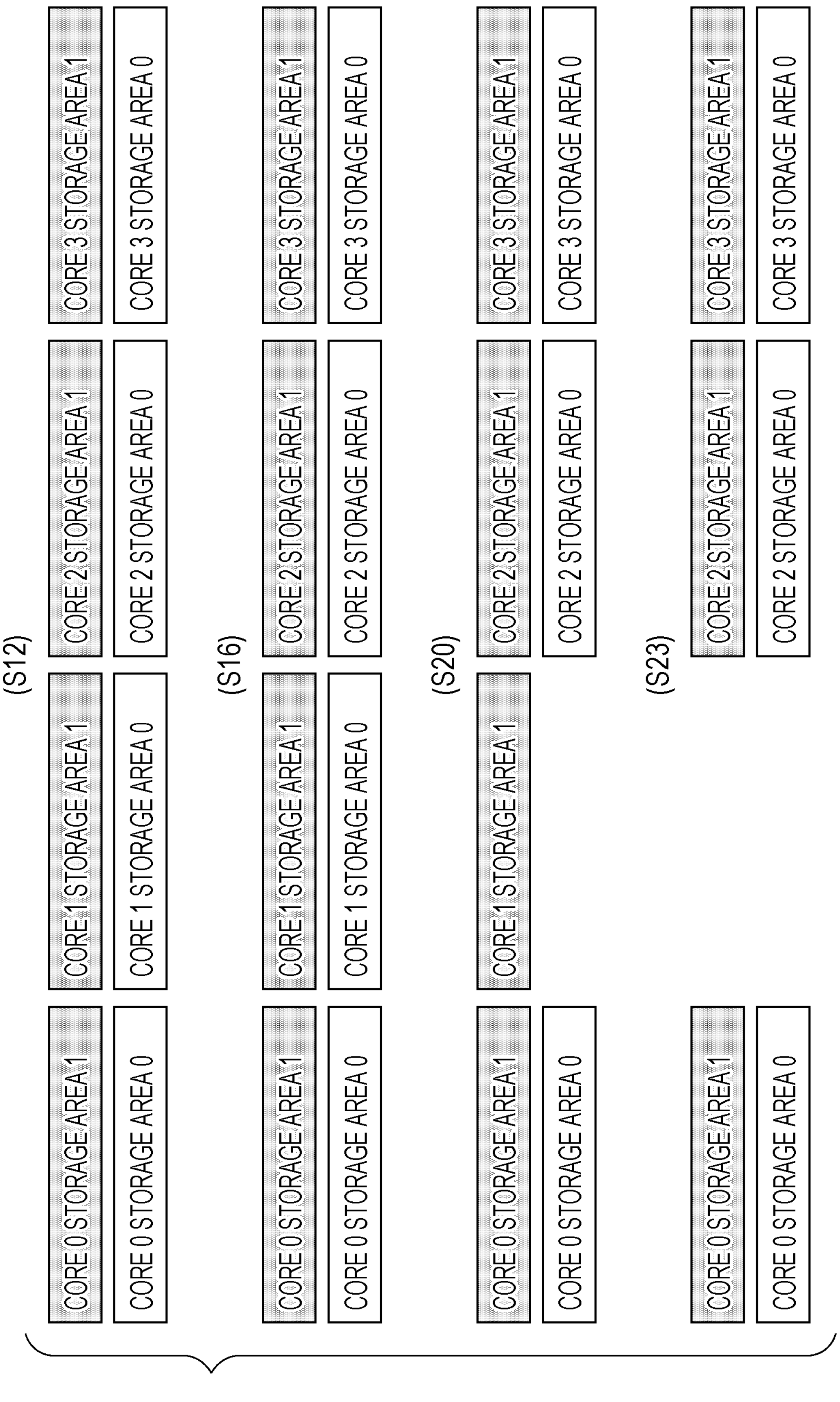
FIG. 10 is a diagram illustrating an example of RAM update states corresponding to the operations by the control apparatus illustrated in FIG. 9.

FIG. 9 is a sequence diagram illustrating an example of operations by the control apparatus 30A according to the second exemplary embodiment. FIG. 10 is a diagram illustrating an example of RAM 13A update states corresponding to the operations by the control apparatus 30A illustrated in FIG. 9.

In one example, in step S11 of FIG. 9, each of the CPU cores 0 to 3 writes and updates normal operation information to the corresponding storage areas 0 in the RAM 13A illustrated in FIG. 8 described above. However, this assumes that normal operation information has already been written to the storage areas 1 in the RAM 13A.

In step S12, the CPU core 0 checks whether normal operation information has been updated in either or both of the corresponding multiple storage areas 0 and 1 in the RAM 13A for each of the CPU cores 0 to 3. In step S12 of FIG. 10, both of the core 0 storage areas 0 and 1 corresponding to the CPU core 0 have been updated, and both of the core 1 storage areas 0 and 1 corresponding to the CPU core 1 have been updated. Similarly, both of the core 2 storage areas 0 and 1 corresponding to the CPU core 2 have been updated, and both of the core 3 storage areas 0 and 1 corresponding to the CPU core 3 have been updated. Note that herein, the storage areas 1 precede the storage areas 0 chronologically. In this case, it is also possible to check only the storage areas 1.

In step S13, if the CPU core 0 confirms that normal operation information has been updated in either or both of the corresponding multiple storage areas 0 and 1 in the RAM 13A for each of the multiple CPU cores 0 to 3, the CPU core 0 instructs the WDT 21 to clear the timer count through the input-output OF 11B.

In step S14, the WDT 21 clears the timer count according to the clear instruction from the CPU core 0, and starts a new timer count.

In step S15, each of the CPU cores 0 to 3 writes and updates normal operation information to the corresponding storage areas 1 in the RAM 13A.

In step S16, the CPU core 0 checks whether normal operation information has been updated in either or both of the corresponding multiple storage areas 0 and 1 in the RAM 13A for each of the CPU cores 0 to 3. In step S16 of FIG. 10, the multiple storage areas 0 and 1 corresponding to each of the CPU cores 0 to 3 have both been updated. Note that herein, the storage areas 0 precede the storage areas 1 chronologically. In this case, it is also possible to check only the storage areas 0.

In step S17, if the CPU core 0 confirms that normal operation information has been updated in either or both of the corresponding multiple storage areas 0 and 1 in the RAM 13A for each of the multiple CPU cores 0 to 3, the CPU core 0 instructs the WDT 21 to clear the timer count through the input-output OF 11B.

!!!

In step S18, the WDT 21 clears the timer count according to the clear instruction from the CPU core 0, and starts a new timer count.

In step S19, each of the CPU cores 0, 2, and 3 writes and updates normal operation information to the corresponding storage areas 0 in the RAM 13A. On the other hand, the CPU core 1 does not write normal operation information to the corresponding storage area 0 in the RAM 13A, and therefore the information is not updated.

In step S20, the CPU core 0 checks whether normal operation information has been updated in either or both of the corresponding multiple storage areas 0 and 1 in the RAM 13A for each of the CPU cores 0 to 3. In step S20 of FIG. 10, the multiple storage areas 0 and 1 corresponding to each of the CPU cores 0, 2, and 3 have both been updated. On the other hand, of the multiple storage areas 0 and 1 corresponding to the CPU core 1, only the storage area 1 has been updated and the storage area 0 has not been updated. Note that herein, the storage areas 1 precede the storage areas 0 chronologically. In this case, it is also possible to check only the storage areas 1.

In step S21, if the CPU core 0 confirms that normal operation information has been updated in either or both of the corresponding multiple storage areas 0 and 1 in the RAM 13A for each of the multiple CPU cores 0 to 3, the CPU core 0 instructs the WDT 21 to clear the timer count through the input-output OF 11B. Note that the "timer count" step by the WDT 21 is omitted from illustration.

In step S22, each of the CPU cores 0, 2, and 3 writes and updates normal operation information to the corresponding storage areas 1 in the RAM 13A. On the other hand, the CPU core 1 does not write normal operation information to the corresponding storage area 1 in the RAM 13A, and therefore the information is not updated.

In step S23, the CPU core 0 checks whether normal operation information has been updated in either or both of the corresponding multiple storage areas 0 and 1 in the RAM 13A for each of the CPU cores 0 to 3. In step S23 of FIG. 10, the multiple storage areas 0 and 1 corresponding to each of the CPU cores 0, 2, and 3 have been updated, but on the other hand, neither of the multiple storage areas 0 and 1 corresponding to the CPU core 1 has been updated. That is, normal operation information has been updated in none of the multiple storage areas 0 and 1 for the CPU core 1, and therefore an abnormality of some kind in the CPU core 1 is detected. If a core abnormality is detected, restoration is performed through a process of resetting only the abnormal core to put the system into a safe state, for example. Alternatively, restoration may be performed through a reboot by resetting all CPU cores from the WDT 21, without clearing the WDT 21.

Figure 11:
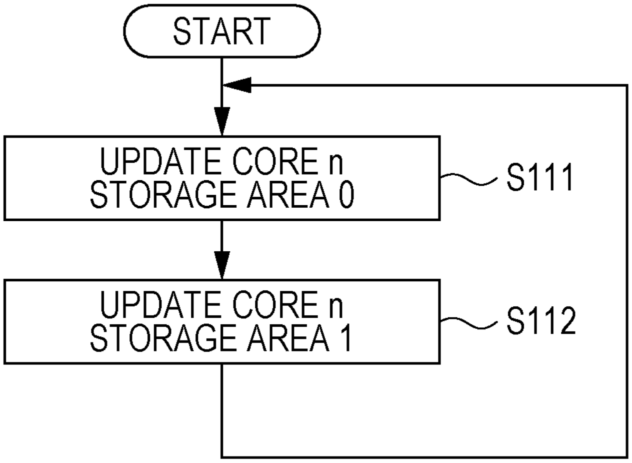
FIG. 11 is a flowchart illustrating an example of the flow of processing by control programs in multiple CPU cores according to the second exemplary embodiment.

Next, FIG. 11 will be referenced to describe the action of the control apparatus 30A according to the second exemplary embodiment.

FIG. 11 is a flowchart illustrating an example of the flow of processing by control programs in the multiple CPU cores 0 to 3 according to the second exemplary embodiment.

First, control programs are launched by each of the multiple CPU cores 0 to 3, and the following steps are executed.

In one example, in step S111 of FIG. 11, each of the CPU cores 0 to 3 writes and updates normal operation information to the corresponding core n (where n=0 to 3) storage area 0 in the RAM 13A illustrated in FIG. 8 described above.

In step S112, each of the CPU cores 0 to 3 writes and updates normal operation information to the corresponding core n (where n=0 to 3) storage area 1 in the RAM 13A, after which the flow returns to step S111 and the process is repeated.

In this way, according to the present exemplary embodiment, contention among notifications from multiple processor cores is avoided, even if the memory update timings do not coincide among the multiple processor cores. Accordingly, it is possible to keep the monitor from incorrectly recognizing that the processor cores are not operating normally, and initiating an unnecessary reset.

Third Exemplary Embodiment

A third exemplary embodiment describes a configuration in which, if an abnormality occurs in a first processor core, the first processor core is substituted with a different processor core.

Figure 12:
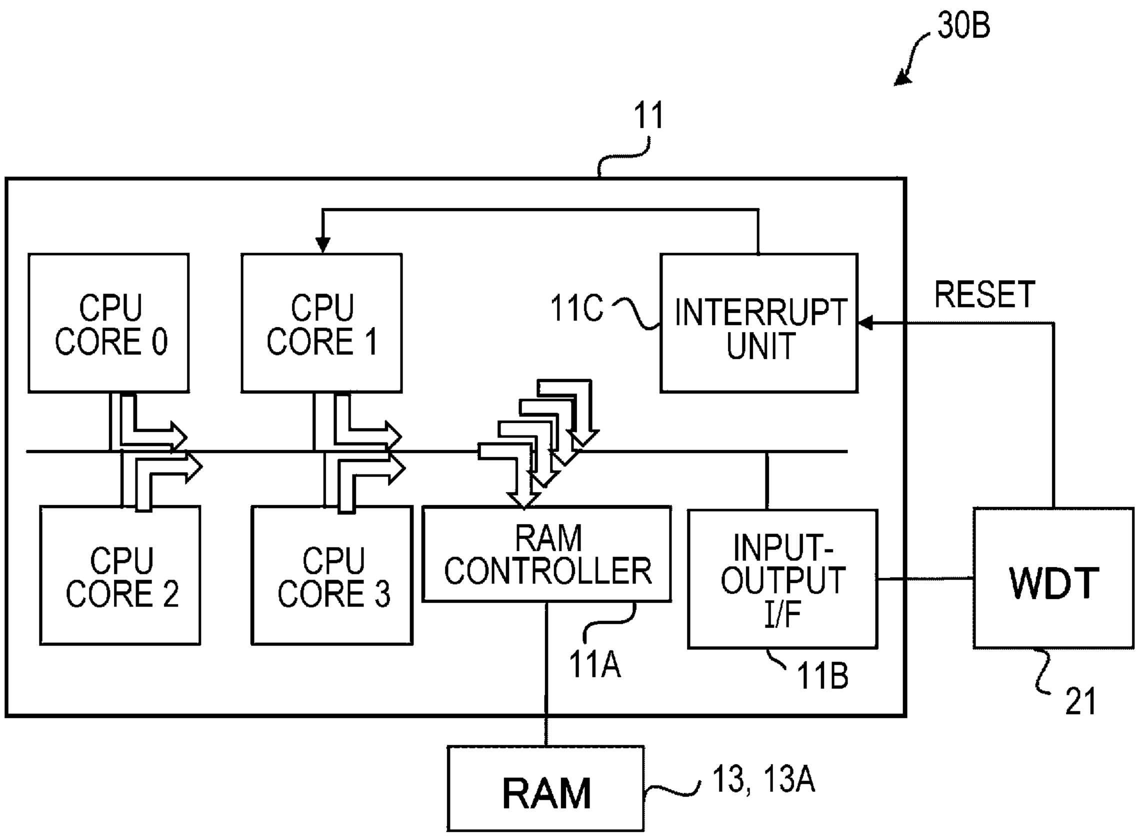
FIG. 12 is a block diagram illustrating an example of a configuration of a control apparatus according to a third exemplary embodiment.

FIG. 12 is a block diagram illustrating an example of a configuration of a control apparatus 30B according to the third exemplary embodiment.

As illustrated in FIG. 12, the control apparatus 30B is provided with a CPU 11. The CPU 11 is provided with multiple CPU cores 0 to 3, a RAM controller 11A, an input-output OF 11B, and an interrupt unit 11C. Besides the inclusion of the interrupt unit 11C, the configuration is similar to the control apparatus 30 described in the first exemplary embodiment or the control apparatus 30A described in the second exemplary embodiment above.

The WDT 21 outputs a reset signal for resetting all of the multiple CPU cores 0 to 3 if there is no instruction for a fixed time or longer from the CPU core 0 serving as the first CPU core.

The interrupt unit 11C receives the reset signal from the WDT 21 and performs, according to the received reset signal, an interrupt process that substitutes the CPU core 0 with a predetermined different CPU core (in the example of FIG. 12, the CPU core 1).

That is, in the case where an abnormality occurs in the CPU core 0 performing the update check of the RAM 13 or the RAM 13A, it may be difficult to reset and restore the CPU core 0 only. Accordingly, a reset request from the WDT 21 is received as an interrupt by a different core, such as the CPU core 1 for example, and only the CPU core 0 performing the update check of the RAM 13 or the RAM 13A is reset and restored from the CPU core 1.

Figure 13:
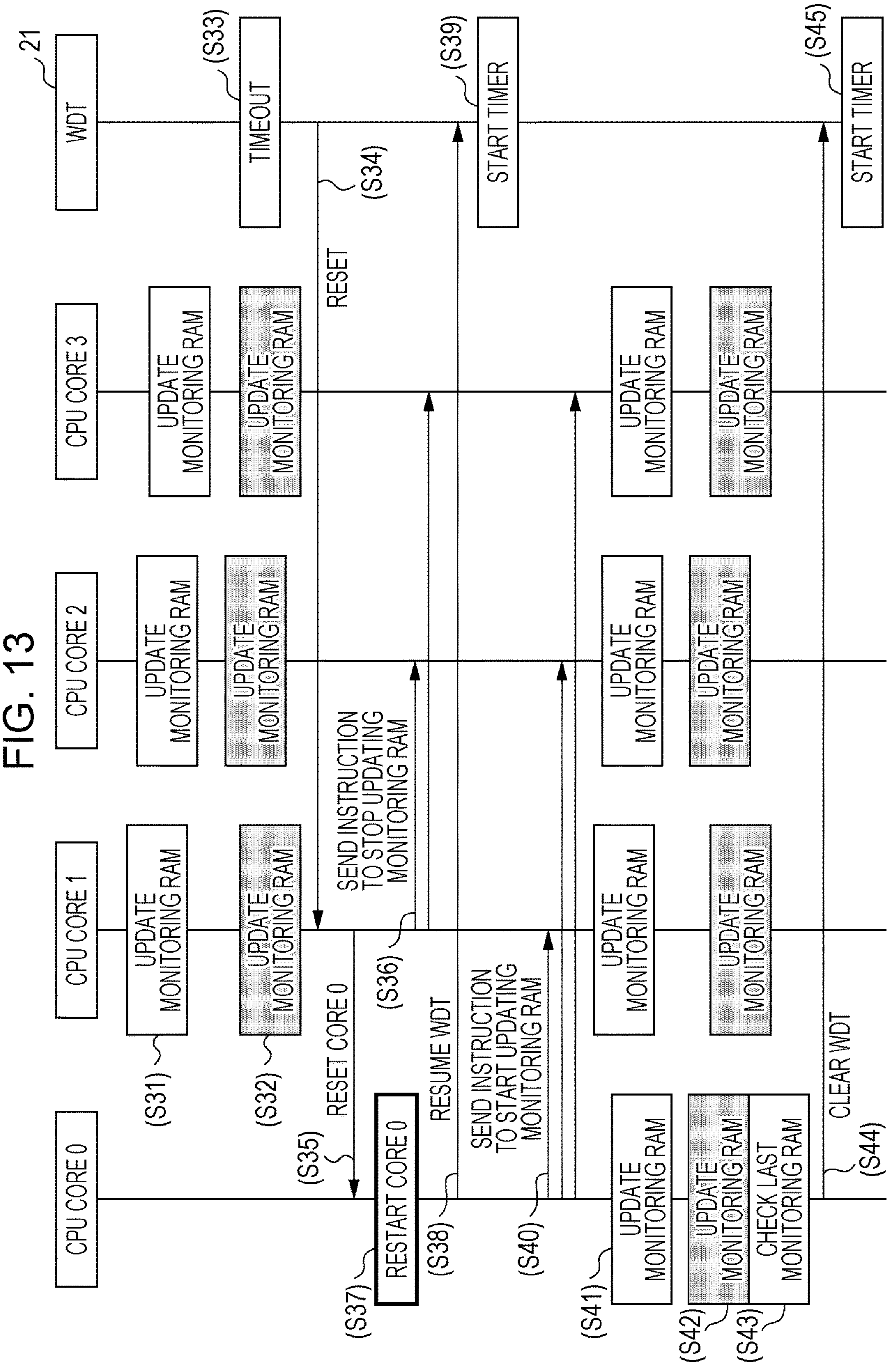
FIG. 13 is a sequence diagram illustrating an example of operations by the control apparatus according to the third exemplary embodiment.

FIG. 13 is a sequence diagram illustrating an example of operations by the control apparatus 30B according to the third exemplary embodiment. Note that the present example describe the case of implementing the RAM 13A illustrated in FIG. 8 above.

In one example, in step S13 of FIG. 13, each of the CPU cores 1 to 3 writes and updates normal operation information to the corresponding storage areas 0 in the RAM 13A illustrated in FIG. 8 described above. On the other hand, the CPU core 0 serving as the first CPU core does not write normal operation information to the corresponding storage area 0 in the RAM 13A, and therefore the information is not updated.

In step S32, each of the CPU cores 1 to 3 writes and updates normal operation information to the corresponding storage areas 1 in the RAM 13A. On the other hand, the CPU core 0 likewise does not write normal operation information to the corresponding storage area 1 in the RAM 13A, and therefore the information is not updated.

In step S33, the WDT 21 receives no instruction from the CPU core 0 for a fixed time or longer, and therefore a timeout occurs.

In step S34, the WDT 21 transmits a reset signal to the interrupt unit 11C, and a reset signal is transmitted from the interrupt unit 11C to a predetermined different CPU core, namely the CPU core 1.

In step S35, the CPU core 1 transmits a reset signal to the CPU core 0 in which an abnormality has occurred.

In step S36, the CPU core 1 instructs each of the CPU cores 2 and 3 to stop updating the RAM 13A.

In step S37, the CPU core 0 reboots in response to the reset signal from the CPU core 1.

In step S38, the rebooted CPU core 0 issues a timer count resume request to the WDT 21.

In step S39, the WDT 21 resumes the timer count in response to the resume request from the CPU core 0.

In step S40, the CPU core 0 instructs each of the CPU cores 1 to 3 to stop updating the RAM 13A.

In step S41, each of the CPU cores 0 to 3 writes and updates normal operation information to the corresponding storage areas 0 in the RAM 13A.

In step S42, each of the CPU cores 0 to 3 writes and updates normal operation information to the corresponding storage areas 1 in the RAM 13A.

In step S43, the CPU core 0 checks whether normal operation information has been updated in either or both of the corresponding multiple storage areas 0 and 1 in the RAM 13A for each of the CPU cores 0 to 3. At this time, it is also possible to check only the chronologically preceding storage areas.

In step S44, if the CPU core 0 confirms that normal operation information has been updated in either or both of the corresponding multiple storage areas 0 and 1 in the RAM 13A for each of the multiple CPU cores 0 to 3, the CPU core 0 instructs the WDT 21 to clear the timer count through the input-output OF 11B.

In step S45, the WDT 21 clears the timer count according to the clear instruction from the CPU core 0, and starts a new timer count.

In this way, according to the present exemplary embodiment, even if an abnormality occurs in a first processor core, the first processor core is substituted with a different processor core. With this arrangement, contention among notifications from the multiple processor cores is avoided. Accordingly, it is possible to keep the monitor from incorrectly recognizing that the processor cores are not operating normally, and initiating an unnecessary reset.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The exemplary embodiments may also be configured as programs that cause a computer to execute the functions of each component provided in the control apparatus. The exemplary embodiments may also be configured as a non-transitory computer-readable storage medium storing the programs.

Otherwise, the configurations of the control apparatus described in the exemplary embodiments above are examples, and may be modified according to circumstances within a range that does not depart from the gist.

Also, the process flows of the programs described in the exemplary embodiments above are examples, and unnecessary steps may be removed, new steps may be added, or the processing sequence may be rearranged within a range that does not depart from the gist.

Also, the exemplary embodiments above describe a case in which the processing according to the exemplary embodiments is realized by a software configuration using a computer by executing programs, but the configuration is not limited thereto. The exemplary embodiments may also be realized by a hardware configuration, or by a combination of a hardware configuration and a software configuration, for example.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX

A control apparatus according to (((1))) comprises: a plurality of processor cores connected to: a monitor that monitors whether a first processor core, the first processor core being any processor core among the plurality of processor cores, is operating normally; and a memory having a plurality of storage areas pre-associated with each of the plurality of processor cores, wherein: each of the plurality of processor cores periodically writes and updates information to the corresponding storage area in the memory, the information indicating that each of the processor cores is operating normally; and the first processor core determines whether the information in each of the storage areas in the memory has been updated by each of the plurality of processor cores, and controls the monitor on a basis of a result of the determination.

A control apparatus according to (((2))) is the control apparatus according to (((1))), wherein a timing at which the first processor core determines the presence or absence of an update of the information is different from a timing at which each of the plurality of processor cores updates the information.

A control apparatus according to (((3))) is the control apparatus according to (((2))), wherein the first processor core determines the presence or absence of the update of the information between one update and a next update of the information.

A control apparatus according to (((4))) is the control apparatus according to any one of (((1))) to (((3))), wherein the memory has a plurality of the storage areas for each of the plurality of processor cores, each of the plurality of processor cores periodically writes the information sequentially to the corresponding plurality of storage areas in the memory, and the first processor determines that the information has been updated if the information has been updated in either or both of the plurality of storage areas.

A control apparatus according to (((5))) is the control apparatus according to (((4))), wherein the first processor determines that the information has not been updated if the information has been updated in none of the plurality of storage areas.

A control apparatus according to (((6))) is the control apparatus according to any one of (((1))) to (((3))), wherein if the information has been updated for each of the plurality of processor cores, the first processor core instructs the monitor to clear a count.

A control apparatus according to (((7))) is the control apparatus according to (((6))), wherein if the information has not been updated for one or more of the plurality of processor cores, the first processor core determines that an abnormality has occurred and instructs the monitor to reset all of the plurality of processor cores.

A control apparatus according to (((8))) is the control apparatus according to (((6))), wherein if the information has not been updated for one or more of the plurality of processor cores, the first processor core determines that an abnormality has occurred and instructs the monitor to reset only the processor core in which the abnormality has occurred from among the plurality of processor cores.

A control apparatus according to (((9))) is the control apparatus according to any one of (((1))) to (((8))), wherein if there is no instruction for a fixed time or longer from the first processor core, the monitor outputs a reset signal that resets all of the plurality of processor cores.

A control apparatus according to (((10))) is the control apparatus according to (((9))), further comprising: an interrupt unit that receives the reset signal from the monitor and performs, according to the received reset signal, an interrupt process that substitutes the first processor core with a predetermined different processor core.

An image processing apparatus according to (((11))) comprises: the control apparatus according to any one of (((1))) to (((10))); and an image processor controlled by the control apparatus.

A control program according to (((12))) is a control program executed by a first processor core from among a plurality of processor cores, the first processor core being any one of the plurality of processor cores, the plurality of processor cores being connected to a monitor that monitors whether the first processor core is operating normally and a memory having a plurality of storage areas pre-associated with each of the plurality of processor cores, wherein periodically writing and updating information to the storage area corresponding to the first processor core in the memory, the information indicating that the first processor core is operating normally, and controlling the monitor on the basis of whether the information in each of the storage areas in the memory has been updated by each of the plurality of processor cores.

What is claimed is:

1. A control apparatus comprising:

a plurality of processor cores connected to:

a monitor that monitors whether a first processor core, the first processor core being any processor core among the plurality of processor cores, is operating normally;

a memory having a plurality of storage areas pre-associated with each of the plurality of processor cores, wherein:

each of the plurality of processor cores periodically writes and updates information to the corresponding storage area in the memory, the information indicating that each of the processor cores is operating normally;

the first processor core determines whether the information in each of the storage areas in the memory has been updated by each of the plurality of processor cores, and controls the monitor on a basis of a result of the determination; and if there is no instruction for a fixed time or longer from the first processor core, the monitor outputs a reset signal that resets all of the plurality of processor cores; and an interrupt unit that receives the reset signal from the monitor and performs, according to the received reset signal, an interrupt process that substitutes the first processor core with a predetermined different processor core.

2. The control apparatus according to claim 1, wherein a timing at which the first processor core determines the presence or absence of an update of the information is different from a timing at which each of the plurality of processor cores updates the information.

3. The control apparatus according to claim 2, wherein the first processor core determines the presence or absence of the update of the information between one update and a next update of the information.

4. The control apparatus according to claim 1, wherein:

the memory has a plurality of the storage areas for each of the plurality of processor cores;

each of the plurality of processor cores periodically writes the information sequentially to the corresponding plurality of storage areas in the memory; and the first processor core determines that the information has been updated if the information has been updated in either or both of the plurality of storage areas.

5. The control apparatus according to claim 4, wherein the first processor core determines that the information has not been updated if the information has been updated in none of the plurality of storage areas.

6. The control apparatus according to claim 1, wherein if the information has been updated for each of the plurality of processor cores, the first processor core instructs the monitor to clear a count.

7. The control apparatus according to claim 6, wherein if the information has not been updated for one or more of the plurality of processor cores, the first processor core determines that an abnormality has occurred and instructs the monitor to reset all of the plurality of processor cores.

8. The control apparatus according to claim 6, wherein if the information has not been updated for one or more of the plurality of processor cores, the first processor core determines that an abnormality has occurred and instructs the monitor to reset only the processor core in which the abnormality has occurred from among the plurality of processor cores.

9. An image processing apparatus comprising:

the control apparatus according to claim 1; and an image processor controlled by the control apparatus.

10. An image processing apparatus comprising:

the control apparatus according to claim 2; and an image processor controlled by the control apparatus.

11. An image processing apparatus comprising:

the control apparatus according to claim 3; and an image processor controlled by the control apparatus.

12. An image processing apparatus comprising:

the control apparatus according to claim 4; and an image processor controlled by the control apparatus.

13. An image processing apparatus comprising:

the control apparatus according to claim 5; and an image processor controlled by the control apparatus.

14. An image processing apparatus comprising:

the control apparatus according to claim 6; and an image processor controlled by the control apparatus.

15. An image processing apparatus comprising:

the control apparatus according to claim 7; and an image processor controlled by the control apparatus.

16. An image processing apparatus comprising:

the control apparatus according to claim 8; and an image processor controlled by the control apparatus.

17. A control method of a first processor core from among a plurality of processor cores, the first processor core being any processor core among the plurality of processor cores, the plurality of processor cores being connected to:

a monitor that monitors whether the first processor core is operating normally; and a memory having a plurality of storage areas pre-associated with each of the plurality of processor cores, the control method comprising:

periodically writing and updating information to the storage area corresponding to the first processor core in the memory, the information indicating that the first processor core is operating normally;

controlling the monitor on a basis of whether the information in each of the storage areas in the memory has been updated by each of the plurality of processor cores;

outputting, by the monitor, a reset signal that resets all of the plurality of processor cores if no instruction is received from the first processor core for a fixed time or longer; and receiving by an interrupt unit, the reset signal from the monitor and performing, according to the received reset signal, an interrupt process that substitutes the first processor core with a predetermined different processor core.

18. A non-transitory computer readable medium storing a program causing a computer to execute a control process of a first processor core from among a plurality of processor cores, the first processor core being any processor core among the plurality of processor cores, the plurality of processor cores being connected to:

a monitor that monitors whether the first processor core is operating normally; and a memory having a plurality of storage areas pre-associated with each of the plurality of processor cores, the control process comprising:

periodically writing and updating information to the storage area corresponding to the first processor core in the memory, the information indicating that the first processor core is operating normally;

controlling the monitor on a basis of whether the information in each of the storage areas in the memory has been updated by each of the plurality of processor cores;

outputting, by the monitor, a reset signal that resets all of the plurality of processor cores if no instruction is received from the first processor core for a fixed time or longer, and receiving, by an interrupt unit, the reset signal from the monitor and performing, according to the received reset signal, an interrupt process that substitutes the first processor core with a predetermined different processor core.

* * * * *